United States Patent
Epstein

(10) Patent No.: US 9,852,218 B1
(45) Date of Patent: Dec. 26, 2017

(54) SYSTEM AND METHOD FOR DISTRIBUTING MEDIA VIA PORTABLE STORAGE

(75) Inventor: Joseph Alan Epstein, Pleasanton, CA (US)

(73) Assignee: Joseph Alan Epstein, Pleasanton, CA (US)

( * ) Notice: Subject to any disclaimer, the term of this patent is extended or adjusted under 35 U.S.C. 154(b) by 0 days.

(21) Appl. No.: 12/982,877

(22) Filed: Dec. 31, 2010

Related U.S. Application Data

(60) Provisional application No. 61/291,845, filed on Jan. 1, 2010.

(51) Int. Cl.
*G06F 17/30* (2006.01)

(52) U.S. Cl.
CPC .. *G06F 17/30846* (2013.01); *G06F 17/30858* (2013.01)

(58) Field of Classification Search
None
See application file for complete search history.

(56) References Cited

U.S. PATENT DOCUMENTS

| | | | |
|---|---|---|---|
| 7,150,045 B2 | 12/2006 | Koelle | |
| 7,349,886 B2 | 3/2008 | Morten | |
| 7,356,143 B2 | 4/2008 | Morten | |
| 7,577,677 B2 | 8/2009 | Collart | |
| 7,689,510 B2 | 3/2010 | Lamkin | |
| 7,702,592 B2 | 4/2010 | Taylor | |
| 7,853,474 B2 | 12/2010 | Ullah | |
| 7,860,798 B2 | 12/2010 | Rubinstein | |
| 8,069,257 B1* | 11/2011 | Bhatia | G06F 13/105 345/501 |
| 2001/0041973 A1* | 11/2001 | Abkowitz | G06F 17/30905 703/23 |
| 2002/0107991 A1* | 8/2002 | Maguire et al. | 709/250 |
| 2006/0098956 A1* | 5/2006 | Wang | H04N 5/85 386/231 |
| 2007/0186180 A1* | 8/2007 | Morgan | 715/779 |
| 2008/0052461 A1* | 2/2008 | Kavian | G06F 3/0607 711/115 |
| 2008/0134237 A1* | 6/2008 | Tu et al. | 725/38 |
| 2008/0276065 A1* | 11/2008 | Jeong | G06F 12/0246 711/173 |
| 2009/0150553 A1* | 6/2009 | Collart et al. | 709/229 |
| 2009/0319723 A1* | 12/2009 | Grover | G06F 8/65 711/103 |
| 2009/0324196 A1* | 12/2009 | Ueda et al. | 386/94 |

\* cited by examiner

*Primary Examiner* — Son T Hoang
(74) *Attorney, Agent, or Firm* — James M. Wu; JW Law Group

(57) ABSTRACT

A system and method for securely delivering and updating media using portable storage. In one embodiment, field-modifiable storage presents itself to the host system as a read-only standardized media player, where the user adds, replaces, or updates media onto that storage. A further embodiment establishes encrypted streaming from field-modifiable storage directly into the graphics processor of the viewing host, bypassing the general-purpose computing infrastructure.

21 Claims, 3 Drawing Sheets

SYSTEM AND METHOD FOR DISTRIBUTING MEDIA VIA PORTABLE STORAGE

CROSS REFERENCE TO RELATED APPLICATION

This application claims the benefit of provisional patent application Ser. No. 61/291,845, filed Jan. 1, 2010 by the present inventor, the entire content of which is hereby incorporated by reference.

BACKGROUND OF THE INVENTION

1. Field of the Invention

The present invention relates to the field of distributing media, such as movies, via a network or with storage.

2. Description of the Prior Art

Movie distribution today is primarily composed of renting or purchasing DVDs and Blu-Ray disks, on one hand, and real-time streaming of video on the other.

The advantages of the former, shipping physical media with read-only movies on it, are quite simple. The consumer gets a physical object in his hand, which he can save for as long as he wants, and can carry it to any location where he wishes to see the movie and an appropriate DVD or Blu-Ray player is available. There is a lag to getting the media in the first place—either the movie is mailed to him, which takes time, or he has to go shopping to find it for rent or sale—and there is always a possibility that the movie will be sold out in the particular store, or the media will get damaged or lost. On the other hand, once the disk is in the consumer's hands, he can view it whenever he wants, whether he is connected to a network or not, with no delays or resource constraints.

The advantages of the latter, real-time streaming, are also simple. There is no delay with real-time streaming; rather, the lag of getting the disk and delaying gratification is replaced with having to be connected to the real-time streaming server over the network, and thus trades instant availability for resource constraints. The consumer can watch whatever he wants—so long as the movie is made available for him—whenever he wants—so long as he is connected to a network of suitable bandwidth. The copyright holder also sees a benefit. With disks, the entire digital contents are sent out at once into the wild, where cheap devices can read it, copy it, and then possibly disseminate it. With real-time streaming, the contents are typically sent in a way that is more difficult to record, and will likely produce an inferior product than a disk in hand. Also, digital rights management can be brought to bear, and issues that plague Blu-Ray (leaked device keys, causing all disks made until then to be compromised) can be eliminated so long as the stream is not recorded.

Of course, the big disadvantage of streamed videos is that you must be networked at that moment to get the video. And with network resources always a possible constraint—even though bandwidth tends to increase over time, so does user adoption and application demands en masse, as is evidenced by the capacity problems AT&T is seeing with the iPhone on their 3G networks—there may be other reasons why not to want streaming.

Companies such as Netflix enable both models, but cannot solve the problems inherent to each.

What would be desired is a way of removing the permanent, never-changing status of the contents that a Blu-Ray and DVD disk provides, while allowing streaming to be an attractive model for off-line viewing. Essentially, if the user can download a movie onto a stable, but mutable and portable storage, in a way that is secure and preserves copyrights, then the user can have his movie now and take it with him too. Furthermore, being able to place it in a compact, shock-resistant device allows the movies to be carried more easily than with disks. Giving such a device a USB or similar interface would allow these movies to be seen on netbooks and other devices that, for cost, power, or size reasons do not have optical drives. Therefore, such a device would simultaneously unlock a broad segment of consumers to now be able to rent or purchase movies far easier than with optical disks.

One way of addressing the problem is to get videos onto USB flash drives. (It should be clear that any stable storage mechanism can be substituted.) If the movie could be copied off of the Blu-ray or DVD disk, then distribution outside of the disk could be reasoned about. That would allow downloads or streaming of the disk image itself, as well as storing it in a portable device.

Of course, Blu-ray and DVD disks from commercial pre-recorded sources are designed not to be able to be copied off of their disks. They employ a multiple-layer scheme (based on CSS for DVDs and AACS for Blu-ray) that involves the disk, the optical drive, and the software player. This is to prevent unauthorized duplication.

At the bottom layer, the sectors of the disk that contain the movie or other protected information is encrypted. One layer up, the optical drives interact with the host system using a disk-based interface (Mt. Fuji for DVD, and pure SCSI for Blu-ray) that prevents the host computer from being able to read the encrypted sectors (even though reading may only mean sending the encrypted data, in its encrypted form) at all, until the host computer or an application running on it authenticates with the optical drive using the appropriate security mechanisms. These mechanisms involve distributing keys to the player, the drive, and the disk. Finally, the key necessary to decrypt the video for Blu-ray requires access to identity information that is not necessarily considered to be a part of the disk image itself, but rather some metadata that can only be read using special authorized commands to the drive (ROM-mark).

What this means is that the optical drive is a required participant for watching the video. Even when all of the sectors of the disk can be copied off of the optical disk onto another storage device (hard disk, USB flash, etc), as is possible once an authorized player software authenticates with the optical drive containing the disk, the security context needed to decrypt the movie and play it is still contained in the optical drive, making that drive a dongle, so to speak. (The player software would still have to be modified or misdirected into believing that the sectors being played are from a disk in that optical drive, so that it could negotiate for the title key, so just having the drive present does not solve the problem by itself.)

Therefore, simply copying the disk image does not solve the problem.

Movies can be encoded in other formats than that of a Blu-ray disk or DVD. There are plenty of methods known to the industry for movies to be encrypted using software-based digital rights management systems. These systems are often proprietary, or are not widely disseminated. Thus, the software has to either come with the movie itself or must be installed in advance on each and every player, as well as possibly on the streaming or download points where the movies are being initially grabbed from the Internet.

Most digital rights management systems suffer from their lack of ubiquity or their complexity—or both. Quite frankly, these systems are often designed with maximizing the flexibility of the revenue-generating options of the content provider, and thus can become bewildering to users who already understand and are used to the simplicity of inserting a Blu-ray or DVD disk into the computer and watching the movie begin with minimal interaction. Ideally, completely proprietary or novel-to-the-user DRM systems ought to be avoided—and yet the security they bring is paramount to protecting the copyrights of the content owner.

Note that DRM can apply to portable movies—ones that can be downloaded once online and played offline later—as well as streaming movies—ones that can only be watched as they are downloaded and are generally designed or regarded as not remaining around for future viewing.

An example in prior art of an attempt to use digital rights management to control copying of movies distributed by USB is with the Roxio/Sonic CinemaNow USB distribution, involving DRM technology from Widevine. These devices, as of this writing not widely available, include media player software, digital rights management software, and the proper codecs to allow supported systems to display movies downloaded onto the USB stick. The disadvantages of this mechanism are clear: the added software burden required by reimplementing a movie player, rather than leveraging existing media interfaces such as Blu-ray, widely limit the devices onto which the CinemaNow USB stick can play. By not taking advantage of the ability of many media interfaces (such as USB) to abstract the functionality of existing and widely-adopted hardware interfaces (such as Blu-ray), the Cinemallow product and those like it are forced to reduce their protection to that of software-based players only. In other words, the value they provide above and beyond a standard USB flash drive is unclear or simply not there, whereas the detriment of requiring custom software on the host computer or device the user is plugging into is very clear. By reusing well-known industry standards for hardware, some of the embodiments of the disclosed invention avoid requiring custom software for playback, and thus can operate with devices designed for the broadest markets and applicability.

Existing media players for disks must keep track with the Blu-ray AACS, DVD CSS, and other existing or potential new encryption methods associated to future drive/disk based content protection schemes. These schemes may require the movie player to decrypt the information. On general-purpose computer systems today, the movie player is often implemented in software, thus exposing vulnerabilities that can be easily exploited to gain either the unencrypted digital content directly, or the necessary encryption keys and authentication information to impersonate the player and allow a hacker to recover unencrypted media using his own means.

As an attempted solution, operating system vendors such as Microsoft have engaged in creating protected media paths through the software system, to thwart memory inspectors and debuggers from being able to gain access to the state in the software movie player. These schemes suffer from the flaw of attempting to prevent one part of the software system from viewing other parts, by performing kernel enforcement techniques (either by shutting down the movie play when an unauthorized kernel module is detected, one which could potentially circumvent the system protection against examining state in the movie player, or performing part-by-part software encryption). Unfortunately, these mechanisms all suffer from the software trusted client problem. Trusted clients necessarily have to expose the unencrypted movie somewhere—the so-called analog hole. Software, by definition, runs on general purpose computing platforms, and thus a trusted software client has to place the unencrypted movie in memory or across a bus—both activities can be easily eavesdropped-upon by common software or hardware implements. Trusted hardware clients, on the other hand, increase the difficulty of accessing the unencrypted information by potentially placing it in locations and across buses segregated from the general-purpose computing infrastructure.

Furthermore, prior art has not sufficiently taken advantage of the graphics processing unit (GPU) to perform the decryption of the media. The GPU is typically a piece of hardware which connects to the computer or player system through a bus on one end, and to the display on the other end. GPUs generally are involved with managing the display frame, including providing two- and three-dimensional drawing primitives (such as may be leveraged by OpenGL). Furthermore, trends in GPU development have lead to GPUs that can perform arbitrary processing of offload software and/or specifically assist in the decoding of compressed video and audio streams. GPUs often possess their own memory, some of which they may expose to the native computing host by a memory bus, and some of which they may contain internally. GPU vendors have APIs such as Nvidia's VDPAU and Intel's VA API that allow movie components (stream data) to be presented directly into the GPU, where the GPU handles the decompression, rendering, and animation without further host involvement.

The following disclosed invention and its embodiments overcome the problems listed above.

SUMMARY

In accordance with one embodiment, a method and system for distributing media such as movies to displays, media players, and computers, using portable storage that provides an interface to the media using an existing specification for typically read-only media with digital rights management.

DETAILED DESCRIPTION

In the description herein, one or more embodiments of the invention are described, with process steps and functional interactions. Those skilled in the art would realize, after perusal of this application, that embodiments of the invention might be implemented using a variety of other techniques not specifically described, without undue experimentation or further invention, and that such other techniques would be within the scope and spirit of the invention.

The scope and spirit of the invention is not limited to specific examples mentioned therein, but is intended to include the most general concepts embodied by these and other terms.

Figure 1:
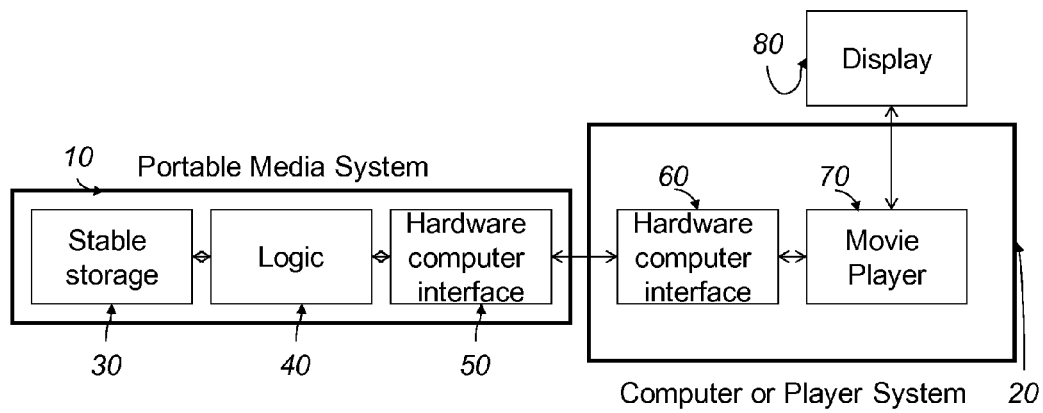
FIG. 1 is a diagram of an embodiment of the invention in one possible method of employment

FIG. 1 depicts the components of one embodiment of the invention. A portable media system 10 comprises a stable storage 30, connected to a logic system 40, and then to a hardware computer interface 50. One embodiment of a stable storage system is a flash chipset, as common in USB flash drives. One embodiment of a hardware computer interface is a USB interface. One embodiment of a portable media system is a USB flash drive. A portable media system, when plugged into a computer or player system 20, may have its hardware computer interface connect to a corresponding hardware computer interface 60, which may be accessed by a movie or media player 70, whose output may and is typically directed to a display 80. One embodiment of a computer or player system is a computer itself, such as a desktop, laptop, or notebook. Another embodiment is a television or other direct display, as an increasing number of televisions come with USB ports and contain computer circuitry to drive the display and handle digital media feeds.

A stable storage 30 may contain one or more movies, which may or may not be encrypted and may or may not be stored in a different form from that originally provided by the content provider or distributor and may or may not be different than the digital format expected by media player software or hardware.

A logic unit 40 contains the personality that the portable media system takes on when attached to a computer or player system. One embodiment of the invention is where the logic provides the functionality to the interface of an optical or otherwise well-known portable media format. In two such embodiments, the logic provides the functionality of a Blu-ray or DVD drive, accepting SCSI or Mt. Fuji commands over the hardware computer interface 50. The logic is typically composed of a microcontroller or processor and memory block, though it can be made out of standalone ASICs, FPGAs, or hardened logic functions. By the logic implementing the hardware computer interface personality of a Blu-ray or other well-known drive, rather than that of a portable storage system (such as a USB flash or hard disk), existing computer or player systems that are prepared to accept Blu-ray or other media will continue to function as before, with usually few or no changes to the user behavior mandated. Furthermore, in some embodiments the stable storage may not likely be optical and bulky, but may be changeable and physically small, and can carry possibly multiple movies (one embodiment is for those multiple movies to be carried as separate DVD, Blu-ray, or other optical image formats, including the necessary side-information.) Using USB as the hardware computer interface, flash as the stable storage, and logic implementing a Blu-ray drive personality is an embodiment of this invention. Once exposed to the novelty contained herein, those skilled in the art would be able to implement various drive personalities for the logic, as per the embodiments, such as with Blu-ray or DVDs. One embodiment has a logic that includes appropriate SCSI or disk discovery and disk-interface requirements, using flash rather than an optical drive as a backing store and using the necessary ROM-Mark and cut-in area information (such as volume ID), as well as the drive key and certificates required by the Blu-ray specification and AACS. One embodiment of the logic contains a Blu-ray personality implementing the AACS BD Specification and the SCSI commands for Blu-ray disks.

An embodiment of the invention is to replace a standalone Blu-ray, DVD, or optical drive that would typically be attached to a display such as a television with a television or display that contains the logic of the movie player, along with one or more hardware computer interfaces for the insertion of a portable media system 10.

Another embodiment of the invention is to have the logic 40 maintain the hard drive, USB flash, or stable storage personality, rather than the optical drive personality, and for digital rights management to be provided either by other means or not at all.

Another embodiment is for the logic 40 to allow its personality to be changeable through instructions by either the host system 20 or another system that the portable media system may interface through via 50. One embodiment is for the logic 40 to be implemented as firmware, software, or a mix of software and hardware, thus possibly allowing for upgrades to implement new features or personalities.

Figure 2:
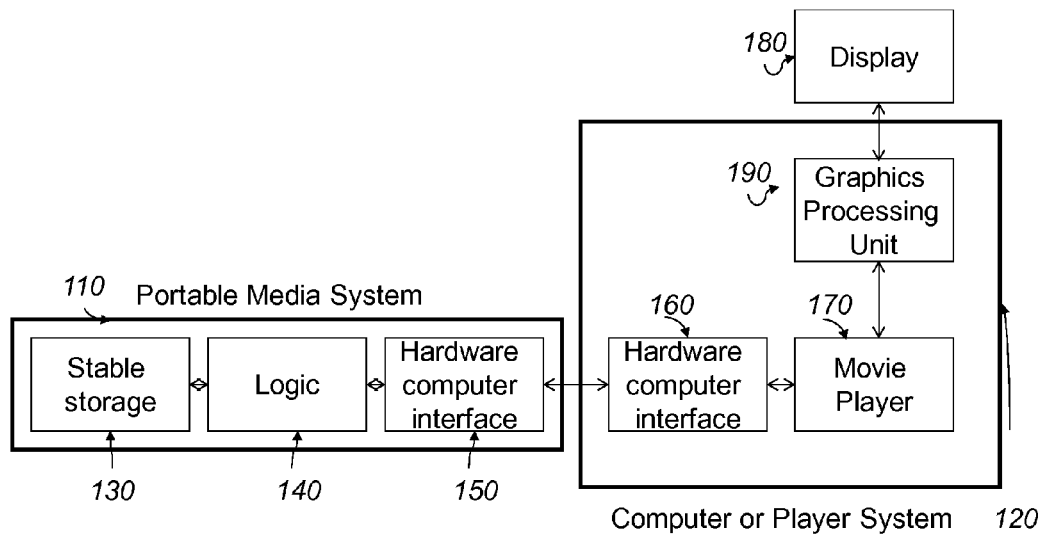
FIG. 2 is a diagram of an embodiment of the invention when used with a computer or player system that possesses a graphics processing unit
Figure 3:
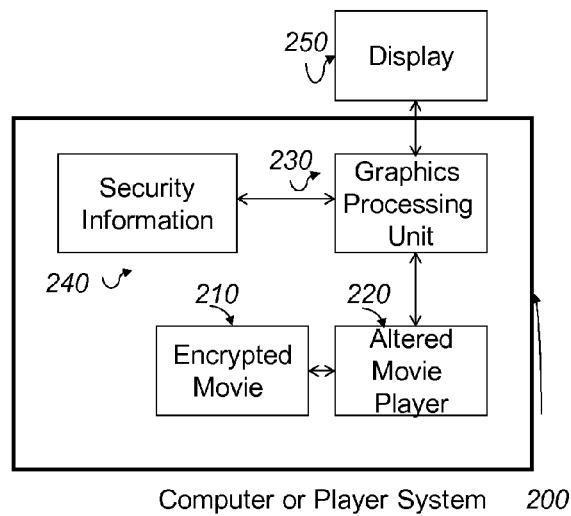
FIG. 3 is a partial diagram of an embodiment of the further invention including a modified graphics processing unit that may provide added security

A further embodiment of this invention operates in conjunction with a graphics processing unit. FIG. 2 identifies a computer or player system 120 that has an additional graphics processing unit 190 (GPU), typically though not necessarily a separate but attached processing unit charged with performing computations to render the display. FIG. 3 identifies an embodiment where a computer or player system 200 comprises a Graphics Processing Unit 230, attached to a display 250. The GPU 230 has security information 240 available to it, information not available to the host central processing unit. To play the move, an altered movie player 220 accesses an encrypted movie 210, and presents parts or all of the media stream to the GPU, in one embodiment handling the functions for controlling the play of the movie (pausing, chapter navigation, etc.) along with potential stream unpacking, but never having access to unencrypted information that can be used to render the movie. In one embodiment, the encrypted movie is in binary representation in the computer or player system 200, and can be in memory or on local storage, in whole or in part as it is encrypted. In one embodiment, the movie player 220 may be software running in the host system 200.

The encrypted movie 210 is encrypted in such a way that requires the security information 240, known only to the GPU, to decrypt it. One embodiment has the encrypted movie encrypted with one part of an asymmetric key pair, with the other part of the key pair derivable from or contained in information in the security information 240. In one embodiment, the encrypted movie is encrypted using a public key, which is decrypted by a private key stored in 240. Another embodiment uses a symmetric key, with the key known to the content creator and embedded in the GPU. Another such embodiment is for the security information 240 to contain a private key part of an asymmetric key pair known as the device private key, and for the movie 210 to be encrypted using a different key known as the title key. In this embodiment, the title key is encrypted using a broadcast or multicast encryption scheme covering decryption by a set of known device private keys, and the encrypted title key is presented as a publicly-viewable part of the encrypted move. Thus, the GPU can use its device key to decrypt the title key, which it then uses to unlock the media stream. The choice of algorithm and key hierarchy may be chosen by those skilled in the art without further invention. As GPUs may have interfaces that typically allows read-back access of the current display, in one embodiment, the GPU additionally blanks out the region that the movie is being played on, when requested by the host, while presenting the proper movie, not blanked out, to the display 250.

Another embodiment of the invention allows the altered movie player 220, or any other process on the host 200, to participate in the GPU's acquisition of the keys necessary to decrypt the movie. One such use may be for when the GPU is unable to directly derive the necessary keys to decrypt one or more parts of the movie stream. In one embodiment, the movie player or other host accesses information available from the movie 210, or from networked, external, or Internet services to assist in the derivation of the key material, by providing this information to the GPU. The GPU may either request the information or be polled for it, or another embodiment has the host or altered movie player access the information and populate the GPU directly. In all cases, the requirement is that the altered movie player or host not have access to enough information to be able to derive the necessary keys, even though it is accessing as an intermediary. One embodiment has the movie encrypted by a title key and the GPU programmed with a device key. When the GPU encounters the encrypted movie, but does not know the title key, it may rely on the host intermediary to discover the title key on its behalf, but encrypted so that the device key will decrypt the title key. One such embodiment is for the host intermediary to access the Internet through a secure website, presenting publicly-identifying information about the GPU, as well as identifying the title. The secure website encrypts the title key for the particular movie such that the GPU can decrypt it with the device private key, and then transmits this to the host. The host then presents the encrypted title key to the GPU, which then decrypts the movie. Note that the host needs no access to the decrypted title key—it is just a relay agent.

Figure 4:
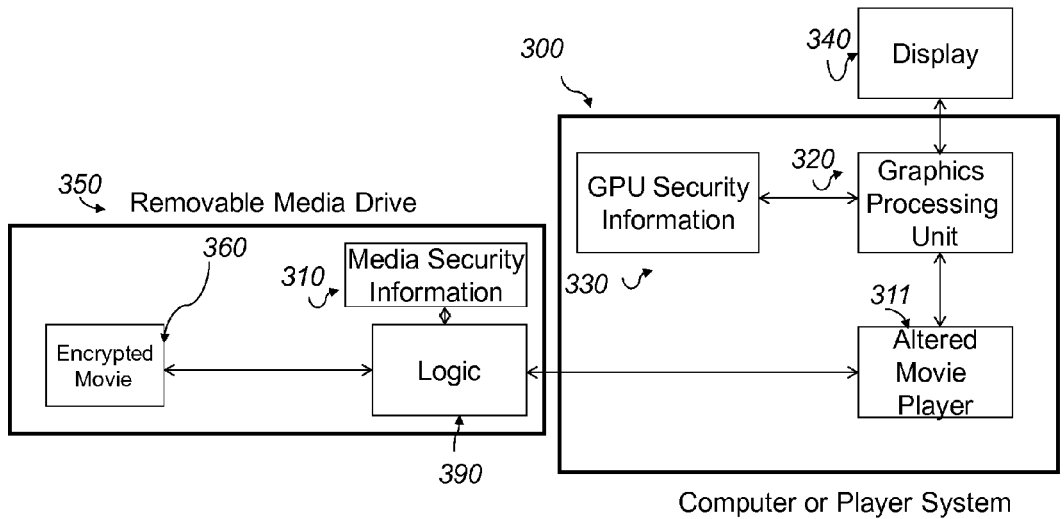
FIG. 4 is a partial diagram of an embodiment of the invention with the interaction of security information in the graphics processing unit and media security information

FIG. 4 shows a portable media system operating in conjunction with a graphics processing unit. A computer system 300 contains an altered movie player 311, which streams the movie and other commands to a graphics processing unit 320. The GPU contains GPU security information 330 (as with 240). The GPU also outputs to a display 340. An encrypted movie 360 is initially sourced from a removable media drive 350, though a logic interface 390 that has access to media security information 310.

In one embodiment, the altered movie player requests the movie 360 from the media drive logic 390, and presents the stream or derivatives, along with possible commands, to the GPU. The GPU 320 and logic 390 negotiate a secure channel as a part of this. One embodiment has the GPU security information possess key information that is used to authenticate with the logic 390: 330 possesses a device key and 310 possesses a drive key. The GPU and the logic 390 negotiate—one embodiment is to use the AACS architecture with the key and function mappings as specified in the previous sentence—thus not requiring the movie player 311 to possess any key material at all. Again, the mapping of AACS and Blu-ray functions into the invention as stated is clear to anyone skilled in the art and can be performed without further invention upon reading the innovations described herein. The path from the logic 390 to the GPU 320 may include additional encryption steps to ensure that the movie 360 has no ability to be compromised. It is also possible to employ this invention where the movie 360 is not natively encrypted, in cases where movie player 311 or the host system 300 (excluding the GPU) is not trusted, but the medium itself is.

Figure 5:
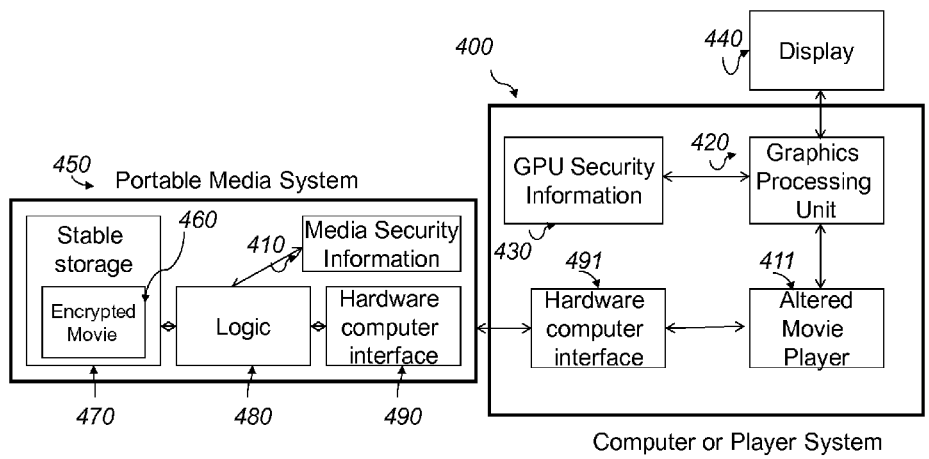
FIG. 5 is a diagram of an embodiment of the invention showing the interactions of the functions also shown in the partial diagrams FIG.4 and FIG. 5

FIG. 5 further illustrates embodiments of this invention. A portable media system 450 substitutes for a removable media drive 350. Within the portable media system, one or more encrypted movies 460 are placed in a stable storage 470 (called out here in the diagram, rather than just with words as in 30, to highlight the parallel to 360). A logic element 480 has access to the stable storage 470 and its contents, as well as media security information 410. Through a hardware computer interface (called out here explicitly to highlight the potential to take a drive personality as in 50), the logic connects to a computer or player system 400 and a hardware computer interface 491. A movie player 411 has access to the portable media system and its personality and exposed contents, as well as a GPU 420, which itself has access to GPU security information 430 and a display 440. This invention, as is readily apparent, combines aspects of the inventions described earlier in this document. The functions of the blocks are as described earlier.

Nothing here is to limit the specific security protocols and encryption paths used in these embodiments, as the choice of protocol is not one of invention itself but of standard application of the art to these inventions. For example, in all cases, more advanced usage and role restrictions (time-of-day, limited number of plays, date and region access) can be applied as known in the art.

One additional embodiment of is,for mutable storage in the portable media system to record additional changing data about the playback, even if the movie itself is not altered. For example, the logic can enforce restriction on the number of times a movie can be played, or the number of computer or player systems that can be used to watch a movie (over time or through a registration system to bind the portable media system to players), recording state changes back to the stable storage.

By replacing optical media with portable stable storage, the stable storage may be mutable, such as flash. This opens up the possibility to change the movies or other content stored on the portable media system.

Another embodiment allows the loading of and changing of the movies or other content stored on the portable media system. Although playback is intimately related to the contents of the media, the description of the invention necessary to enable one skilled in the art to build this invention is clearer if the movie mutation functions are described separately.

Figure 6:
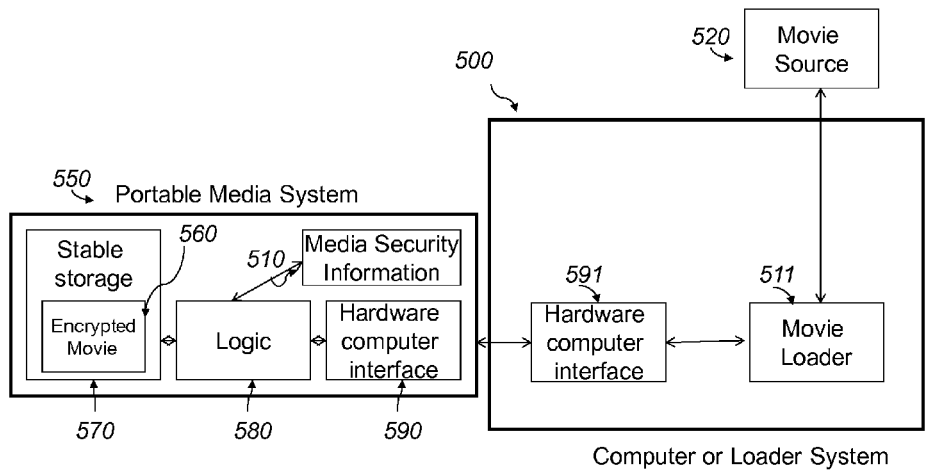
FIG. 6 is a partial diagram of an embodiment of the invention showing functions that allow the content in a portable media system to be updated.

FIG. 6 illustrates a portable media system 550 (as is used for playback) that is connected to a computer or loader system 550. Specifically, a hardware interface 590 binds to a hardware interface 591, which is accessed by a movie loader 511, which can obtain movies from a movie source 520.

The user can use the computer or loader system to add, delete, or update information about one or more encrypted movies 580 placed into the portable media system. The movie loader 511 provides that access, by being able to download the movies from the movie source. One embodiment is for the movie source to be a movie distribution site (akin to Netflix), where movies can be procured for free or a fee, respecting digital rights as needed. The images downloaded from the movie source need not be playable or usable in any other context than when loaded into a portable media system, though the can be. One embodiment is for the downloaded movie from the movie source to be encrypted relative to media security information 510 related to the identity of the portable media system, or related to the identity of the user or subscriber. One embodiment has the movie loader present the subscriber's information to the movie source, along with the identity and public security information of the portable media system. The movie source authenticates the subscriber and the portable media system using this information, applying whatever restrictions are necessary to the content and the form of the distribution. If the user then requests and is granted access to a movie, the movie is downloaded from the movie source encrypted with a key that can be decrypted by the media security information and logic in the portable media system and not by the computer or loader system. This allows the image to be loaded through the hardware interfaces 591 to 590. Once the image is presented to the logic in the portable media system, one embodiment allows for the image to be decrypted once, retaining its native encryption but losing the path encryption from the movie source. This allows the image that is sent to be a Blu-ray image or similar, thus preserving security without requiring remastering the movie content.

The personality that the hardware computer interface 590 exposes by way of the logic 580 can be of several types, all of which are within the scope of the invention. One embodiment is for the logic to present the personality of mutable storage (such as a USB flash). This may be in addition to the logic presenting another simultaneous personality (such as a Blu-ray drive). This specific setup, where the mutable side presents as a USB flash and the movie playback side presents simultaneously as one or more Blu-ray or read-only media disks is one specific embodiment. One possible advantage of this embodiment is that movie management can be performed by typical file-system management tools. The user could simply point his browser to the movie source's secure web server, download a movie and save the image to the USB flash personality with some name that the user might recognize (such as the name of the movie). Once the movie is validated by the logic, the logic presents either a new Blu-ray personality (such as a new drive letter in Windows) or replaces one that exists. Deleting the image from the USB flash personality would eject and dismount the corresponding Blu-ray personality mount. In this case, the movie loader is simply the filesystem manager of the loader system. One variant is for the Blu-ray image to be presented as if complete even when the download is in progress, as movie disk images can be mastered in order of movie timeline, so that as long as the user does not skip too far ahead, the necessary sectors may already be downloaded. (The Blu-ray drive personality can pause or fail reads for sectors not yet loaded.) Another embodiment uses additional communications from the logic to the player and the loader to synchronize user timeslot requests as necessary. How to construct additional download and play features is known to those skilled in the art and can be performed without further invention.

Another embodiment uses proprietary or custom USB or other personalities to access the mutable personality, thus requiring the movie loader to implement this custom or proprietary interface.

Other interface styles to access the mutable personality or personalities are clear to those skilled in the art, without further invention.

One embodiment is for the loader system to be a player system as well. In a further embodiment, a loader can be an internet-connected device (such as a home computer), whereas potentially any device can be a player, connected or not.

One further embodiment of the invention is for any part or all of the necessary software to assume one or more roles (player, loader, etc.) to be stored in the stable storage and exposed to the host player or loader system potentially through auto-play mechanisms.

Although the invention has been described with reference to several exemplary embodiments, it is understood that such descriptions and illustrations are not limiting. Changes may be made within the purview of the appended claims, as presently stated, without departing from the scope and spirit of the invention in its aspects. Although the invention has been described with reference to particular means, materials, machines, and embodiments, the invention is not intended to be limited to the particulars disclosed; rather, the invention extends to all functionally equivalent structures, methods, machines, and uses such as are within the scope of the invention and claims.

I claim:

1. A method of displaying media content comprising:
   downloading the media content from a movie source to a media system;
   storing the media content in a flash-based storage in the media system, wherein the flash-based storage is a first storage type associated with a first interface personality;
   providing a hardware communications interface;
   communicating the media content, in part or in whole, over the hardware communications interface, wherein the communicating is performed using a second interface personality associated with a second storage type but not associated with the first storage type, and wherein the second interface personality is that of an optical drive when the media content is coded in optical data format; and
   accessing the media content from the flash-based storage using the first interface personality; and
   outputting the media content over the hardware communications interface using the second interface personality, wherein the second interface personality is enabled when the media content is at least partially stored in the flash-based storage.

2. The method of claim 1, wherein security operations are performed to make the media content available for display.

3. The method of claim 1, wherein the second interface personality is immutable.

4. The method of claim 1, wherein the second interface personality is mutable.

5. The method of claim 1, wherein the media content is added, changed, replaced, deleted, or updated while the flash-based storage being coupled to the hardware communications interface.

6. The method of claim 5, wherein the media content is made available over a network.

7. The method of claim 1, wherein the hardware communications interface is a Universal Serial Bus interface.

8. The method of claim 1, wherein the first interface personality is associated with a flash memory.

9. The method of claim 1, wherein the first interface personality is associated with a flash memory and the second interface personality is associated with an optical disk storage type.

10. The method of claim 1, wherein the first interface personality is associated with a flash memory and the second interface personality is that of a Digital Video Disc (DVD) drive when the media content is coded in DVD data format.

11. The method of claim 1, wherein the first interface personality is associated with a flash memory and the second interface personality is that of a Blu-ray disc drive when the media content is coded in Blu-ray data format.

12. A system of displaying media content comprising:
a hardware communications interface;
a flash-based storage coupled to the hardware communications interface and configured to store the media content, wherein the flash-based storage is a first storage type associated with a first interface personality;
means for communicating the media content, in part or in whole, over the hardware communications interface, wherein the communicating is performed using a second interface personality associated with a second storage type but not associated with the first storage type, wherein the second interface personality is that of an optical drive when the media content is coded in optical data format
means for accessing the media content from the flash-based storage using the first interface personality; and
means for outputting the media content over the hardware communications interface using the second interface personality, wherein the second interface personality is enabled when the media content is at least partially stored in the flash-based storage.

13. The system of claim 12, wherein security operations are performed to make the media content available for display.

14. The system of claim 12, wherein the second interface personality is immutable.

15. The system of claim 12, wherein the second interface personality is mutable.

16. The system of claim 12, wherein the media content is added, changed, replaced, deleted, or updated while the flash-based storage being coupled to the hardware communications interface.

17. The system of claim 16, wherein the media content is made available over a network.

18. The system of claim 12, wherein the hardware communications interface is a Universal Serial Bus interface.

19. The system of claim 12, wherein the first interface personality is associated with a flash memory.

20. The system of claim 12, wherein the second interface personality is that of a Digital Video Disc (DVD) drive when the media content is coded in DVD data format.

21. An apparatus comprising:
a flash-based storage that stores media content, and wherein the flash-based storage is a first storage type that is associated with a first interface personality;
a hardware communication interface;
logic that communicates the media content, in part or in whole, over the hardware communications interface using a second interface personality associated with a second storage type but not associated with the first storage type, wherein the second interface personality is that of an optical drive when the media content is coded in optical data format;
logic that accesses the media content from the flash-based storage using the first interface personality; and
logic that outputs the media content over the hardware communications interface using the second interface personality, wherein the second interface personality is enabled when the media content is at least partially stored in the flash-based storage.

* * * * *